(12) United States Patent
Sugaya

(10) Patent No.: US 9,032,286 B2
(45) Date of Patent: May 12, 2015

(54) IMAGE PROCESSING APPARATUS, IMAGE PROCESSING SYSTEM, AND RECORDING MEDIUM

(75) Inventor: Takashi Sugaya, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/419,813

(22) Filed: Mar. 14, 2012

(65) Prior Publication Data

US 2012/0240029 A1    Sep. 20, 2012

(30) Foreign Application Priority Data

Mar. 18, 2011  (JP) .................................. 2011-060975

(51) Int. Cl.
*G06F 17/22* (2006.01)
*H04N 1/00* (2006.01)
*G06F 3/12* (2006.01)

(52) U.S. Cl.
CPC ....... *H04N 1/00204* (2013.01); *H04N 1/00427* (2013.01); *H04N 1/00432* (2013.01); *H04N 1/00464* (2013.01); *H04N 1/00482* (2013.01); *H04N 1/00973* (2013.01); *H04N 2201/0039* (2013.01); *H04N 2201/0075* (2013.01); *H04N 2201/0094* (2013.01); *G06F 3/1203* (2013.01);
(Continued)

(58) Field of Classification Search
USPC ......... 715/200, 201, 202, 203, 204, 205, 209, 715/234, 238, 243, 254, 255, 273, 274, 275, 715/276, 700, 760
See application file for complete search history.

(56) References Cited

U.S. PATENT DOCUMENTS

| | | | |
|---|---|---|---|
| 6,628,413 B1 | 9/2003 | Lee | |
| 8,379,239 B2 * | 2/2013 | Asahara | 358/1.14 |
| 8,438,567 B2 * | 5/2013 | Matsushima | 718/100 |

(Continued)

FOREIGN PATENT DOCUMENTS

| | | |
|---|---|---|
| JP | 2001-225531 A | 8/2001 |
| JP | 2002-185684 A | 6/2002 |

(Continued)

OTHER PUBLICATIONS

Office Action (Notice of Grounds of Rejection) issued on May 21, 2013, by the Japanese Patent Office in corresponding Japanese Patent Application No. 2011-060975, and an English Translation of the Office Action. (7 pages).

(Continued)

*Primary Examiner* — Maikhanh Nguyen
(74) *Attorney, Agent, or Firm* — Buchanan Ingersoll & Rooney PC

(57) ABSTRACT

An image processing apparatus can conduct communication with a terminal through a network, and includes a storage, a communication unit, and a changing unit. The storage stores a setting Web page which is of a Web page used to change a setting of the image processing apparatus. The communication unit transmits the setting Web page to the terminal on a request from the terminal. The changing unit changes the setting of the image processing apparatus when a request is made to the setting Web page from the terminal. The setting Web page includes a description that notifies another image processing apparatus, which can conduct communication with the terminal, of a setting content of the image processing apparatus, the setting content being input to the setting Web page from the terminal.

14 Claims, 15 Drawing Sheets

(52) U.S. Cl.
CPC .............. *G06F 3/122* (2013.01); *G06F 3/1231* (2013.01); *G06F 3/1285* (2013.01); *G06F 3/1291* (2013.01)

(56) References Cited

U.S. PATENT DOCUMENTS

| | | | | |
|---|---|---|---|---|
| 8,451,477 | B2* | 5/2013 | Takahashi et al. | 358/1.15 |
| 8,645,961 | B2* | 2/2014 | Yoshimura et al. | 718/102 |
| 8,654,360 | B2* | 2/2014 | Hatano | 358/1.13 |
| 2004/0032614 | A1 | 2/2004 | Tanaka et al. | |
| 2004/0184043 | A1* | 9/2004 | Hirosugi et al. | 358/1.1 |
| 2008/0130041 | A1* | 6/2008 | Asahara | 358/1.15 |
| 2008/0263546 | A1* | 10/2008 | Yoshimura et al. | 718/100 |
| 2009/0094539 | A1* | 4/2009 | Wang et al. | 715/762 |
| 2009/0119553 | A1* | 5/2009 | Matsushima | 714/57 |
| 2009/0310164 | A1* | 12/2009 | Takahashi et al. | 358/1.13 |
| 2010/0107065 | A1* | 4/2010 | Shima et al. | 715/274 |
| 2011/0010642 | A1* | 1/2011 | Nagai | 715/760 |

FOREIGN PATENT DOCUMENTS

| | | |
|---|---|---|
| JP | 2002-290616 A | 10/2002 |
| JP | 2004-080292 A | 3/2004 |
| JP | 2006-202303 A | 8/2006 |
| JP | 2006-285461 A | 10/2006 |
| JP | 2007-241582 A | 9/2007 |
| JP | 2010-109650 A | 5/2010 |

OTHER PUBLICATIONS

Office Action issued on Mar. 3, 2014, by the State Intellectual Property Office of People's Republic of China in corresponding Chinese Patent Application No. 201210068758.X, and an English Translation of the Office Action. (23 pages).

* cited by examiner

FIG.7

```
<!DOCTYPE html>
<html>
<head>
<meta charset="UTF-8">
<script type="text/javascript">
function post() { //PERFORM SETTING TO MFP OF ITSELF AND NOTIFY ANOTHER PAGE OF SETTING
    message = new Array();
    message[0] = document.getElementById("type").value;
    message[1] = document.getElementById("number").value;
    message[2] = document.getElementById("name").value;
    message[3] = document.getElementById("address").value;
    var iframe = document.getElementById("otherPage");
    iframe.contentWindow.postMessage(message, "http://111.222.3.445/");
    iframe.contentWindow.postMessage(message, "http://111.222.3.446/");
    document.getElementById("form").submit; //TRANSMIT SETTING
}
</script>
</head>
<body>
<form method="post" id="form" action="register_address.cgi">
ADDRESS TYPE<div id="type" name="addressType">E-mail</div>
ADDRESS NUMBER<input id="number" name="addressNo" type="text">
ADDRESS NAME<input id="name" name="addressName" type="text">
E-MAIL ADDRESS<input id="address" name="address" type="text">
<button id="button" disabled onclick="post()">OK</button><br/>
</form>
<iframe id="otherPage1" src="otherPage1.html">
<iframe id="otherPage2" src="otherPage2.html">
</iframe>
</body>
</html>
```

701

COMMUNICATION SCRIPT

SCREEN DISPLAY SCRIPT

CONDUCT COMMUNICATION WITH ANOTHER WEB PAGE HAVING DIFFERENT SCRIPT PORTION

DESCRIBE ANOTHER WEB PAGE AS FRAME

FIG.8

```
<!DOCTYPE html>
<html>
<head>
<meta charset="UTF-8">
<script type="text/javascript">
window.addEventListener("message", function(ev) {     DEFINE NOTIFYING LISTENER
    if (ev.origin != "http://111.222.3.444/") {
        return;
    }
    document.getElementById("type").value = message[0];
    document.getElementById("number").value = message[1];
    document.getElementById("name").value = message[2];
    document.getElementById("address").value = message[3];
    document.getElementById("form").submit;     //TRANSMIT SETTING
}, false);
</script>
</head>
<body>
<form method="post" id="form" action="register_address.cgi">
<input id="type" name="addressType" type="hidden">
<input id="number" name="addressNo" type="hidden">
<input id="name" name="addressName" type="hidden">
<input id="address" name="address" type="hidden">
</form>
</body>
</html>
```

COMMUNICATION SCRIPT

SETTING INFORMATION

702

FIG.9
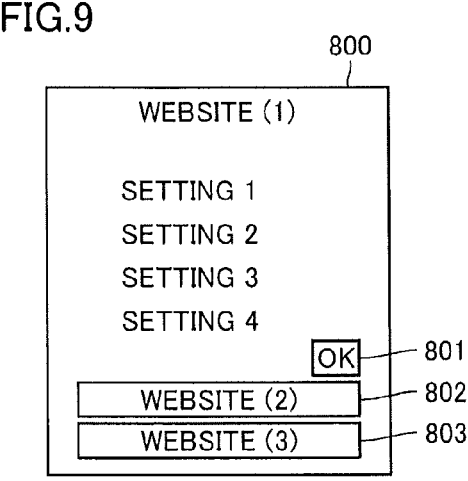
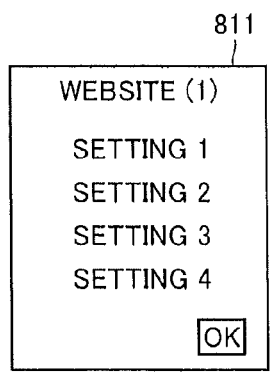
FIG.10A
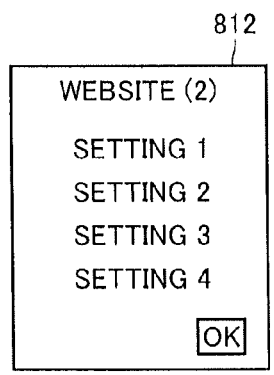
FIG.10B
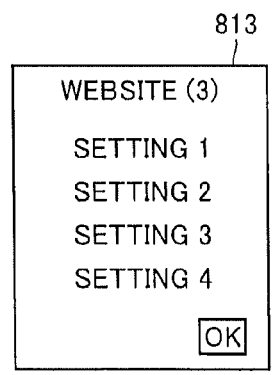
FIG.10C

FIG.15

PLURAL-APPARATUS MANAGEMENT SETTING
(WEBSITE OF 111.222.3.444)                                                    500

SELECT MANAGEMENT TARGET APPARATUS
                                                                    501
                                                         LIST EDIT

| No. | MANAGEMENT TARGET | IP ADDRESS |
|---|---|---|
| 1 | ■ | 111.222.3.445 |
| 2 | ■ | 111.222.3.446 |
| 3 | ☐ | 111.222.3.555 |
| 4 | ☐ | 111.222.3.556 |
| 5 | ☐ | |
| 6 | ☐ | |
| 7 | ☐ | |
| 8 | ☐ | |
| 9 | ☐ | |
| 10 | ☐ | |

OK      CANCEL
502     503

FIG.16

INPUT IP ADDRESS OF ADDED MFP

| No. | IP ADDRESS |
|---|---|
| 1 | 111.222.3.445 |
| 2 | 111.222.3.446 |
| 3 | 111.222.3.555 |
| 4 | 111.222.3.556 |
| 5 | |
| 6 | |
| 7 | |
| 8 | |
| 9 | |
| 10 | |

OK    CANCEL

IMAGE PROCESSING APPARATUS, IMAGE PROCESSING SYSTEM, AND RECORDING MEDIUM

This application is based on Japanese Patent Application No. 2011-060975 filed with the Japan Patent Office on Mar. 18, 2011, the entire content of which is hereby incorporated by reference.

BACKGROUND OF THE INVENTION

1. Field of the Invention

The present invention relates to a setting of an image processing apparatus, particularly to a setting of an image processing apparatus in a network system including a plurality of image processing apparatus.

2. Description of the Related Art

Conventionally various technologies have been disclosed with respect to settings of operating conditions of the image totaling apparatus and image processing apparatus, which constitute the network system.

For example, Japanese Laid-Open Patent Publication No. 2007-241582 discloses a technology in which, in the case that an operating condition of one image forming apparatus that can be connected to a network is set, the image forming apparatus transmits information changing the operating condition in the same way as the image forming apparatus to another image forming apparatus connected to the image forming apparatus through the network. Information specifying a function included in another image forming apparatus connected through the network is stored in the image forming apparatus, and the image forming apparatus transmits only the operating condition of the function overlapping another image forming apparatus in the operating conditions changed by the image forming apparatus to another image forming apparatus.

Japanese Laid-Open Patent Publication No. 2010-109650 discloses a technology in which a management apparatus provided in an image forming system copies setting information between image forming apparatuses. In the image forming system, a user can select an item of the setting information that is permitted to be copied.

In the above technologies of the related art, a setting content in one image processing apparatus on the network can be reflected on another image processing apparatus.

However, in the technology described in Japanese Laid-Open Patent Publication No. 2007-241582, unfortunately it is necessary to construct a complicated mechanism, determination of the function possessed by another image forming apparatus, which transmits and receives information between the image forming apparatuses in order to change the setting of the operating condition in all the image forming apparatuses in the system.

In the technology described in Japanese Laid-Open Patent Publication No. 2010-109650, unfortunately it is necessary to perform a complicated manipulation to select the item in order to copy the setting information between the image forming apparatuses, in a menu screen.

SUMMARY OF THE INVENTION

The invention is devised in order to solve the problem. An object of the invention is to be able to easily set the operating condition of a plurality of image processing apparatuses in the network system while the complicated measure such as the construction of the special mechanism in the image processing apparatus is suppressed to the minimum.

An image processing apparatus according to an aspect of the invention is an image processing apparatus that can conduct communication with a terminal through a network. The image processing apparatus includes: a storage for storing a setting Web page, which is of a Web page used to change a setting of the image processing apparatus; a communication unit for transmitting the setting Web page to the terminal on a request from the terminal; and a changing unit for changing the setting of the image processing apparatus when a request is made to the setting Web page from the terminal. The setting Web page includes a description that notifies another image processing apparatus, which can conduct communication with the terminal, of a setting content of the image processing apparatus. The setting content is input to the setting Web page from the terminal.

A non-transitory recording medium according to another aspect of the invention is a computer-readable recording medium in which a program being able to be executed by a computer, which can conduct communication with a first image processing apparatus and a second image processing apparatus, is recorded in a non-tentative manner. The program causes the computer to execute the steps of: receiving an input of information changing a setting of the first image processing apparatus; transmitting the input information to the first image processing apparatus in response to the input of the information; and transmitting the input information to the second image processing apparatus.

An image processing system according to still another aspect of the invention includes: a terminal; and a plurality of image processing apparatuses each of which can conduct communication with the terminal. In the image processing system, the image processing apparatus includes: a storage for storing a setting Web page, which is of a Web page used to change a setting of the image processing apparatus; a communication unit for transmitting the setting Web page to the terminal on a request from the terminal; and a changing unit for changing the setting of the image processing apparatus when a request is made to the setting Web page from the terminal. The setting Web page includes a description that notifies another image processing apparatus of a setting content of the image processing apparatus. The setting content is input to the setting Web page from the terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates an example of a source code that displays the screen of FIG. 6.

FIG. 8 illustrates a source code of a page that is displayed in a frame of FIG. 7.

FIGS. 9 and 10A to 10C are views illustrating an effect of the embodiment.

FIGS. 15 and 16 are views illustrating address information on the MFP and a setting of management apparatus information.

DESCRIPTION OF THE PREFERRED EMBODIMENTS

Figure 1:
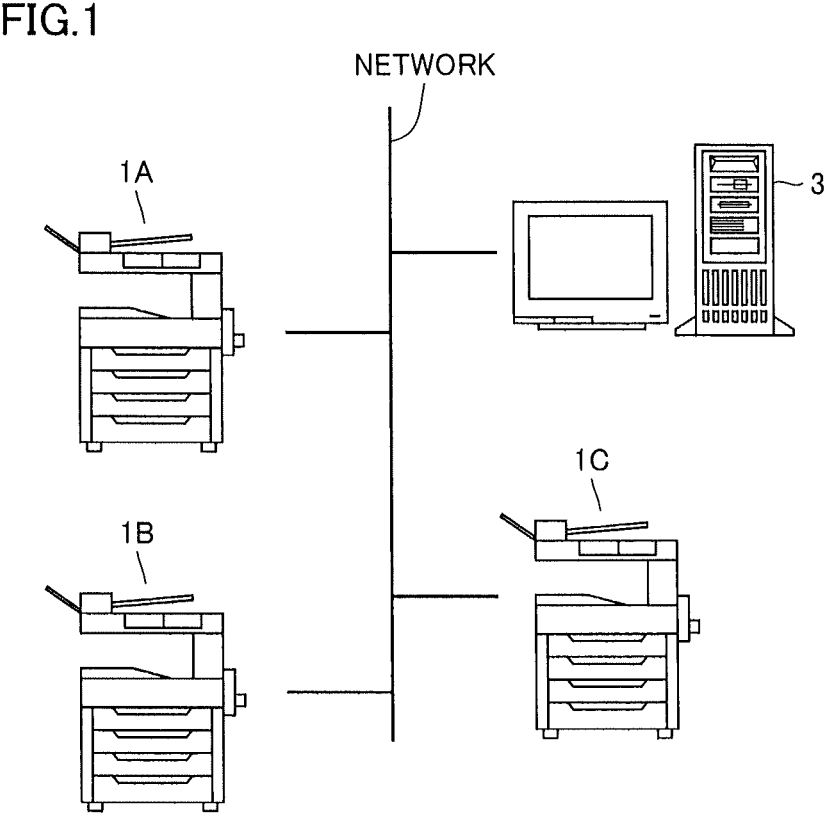
FIG. 1 is a view schematically illustrating a configuration of an image processing system including an image processing apparatus according to an embodiment.

Hereinafter, an embodiment of the invention will be described with reference to the drawings.

In the drawings, an element that exerts the same function is designated by the same numeral, and the overlapping description is omitted.

<Configuration of System>

FIG. 1 is a view schematically illustrating an entire configuration of an image processing system including an image processing apparatus of the present invention.

Referring to FIG. 1, the image processing system includes MFPs 1A, 1B, and 1C and a PC (Personal Computer) 3. Hereinafter MFPs 1A, 1B, and 1C are collectively referred to as an MFP 1 as appropriate. MFP 1 is an example of the image processing apparatus that has a plurality of functions such as a print function, a scan function, a copy function, and a facsimile function. For example, PC 3 is constructed by a general-purpose information processing apparatus. These apparatuses are connected to a network in the image processing system.

The number of MFPs included in the image processing system is not limited to "3" illustrated in FIG. 1 as long as at least two MFPs are included in the image processing system. At least two PCs 3 may be included in the image processing system.

<Outline of Operation in System>

Figure 2:
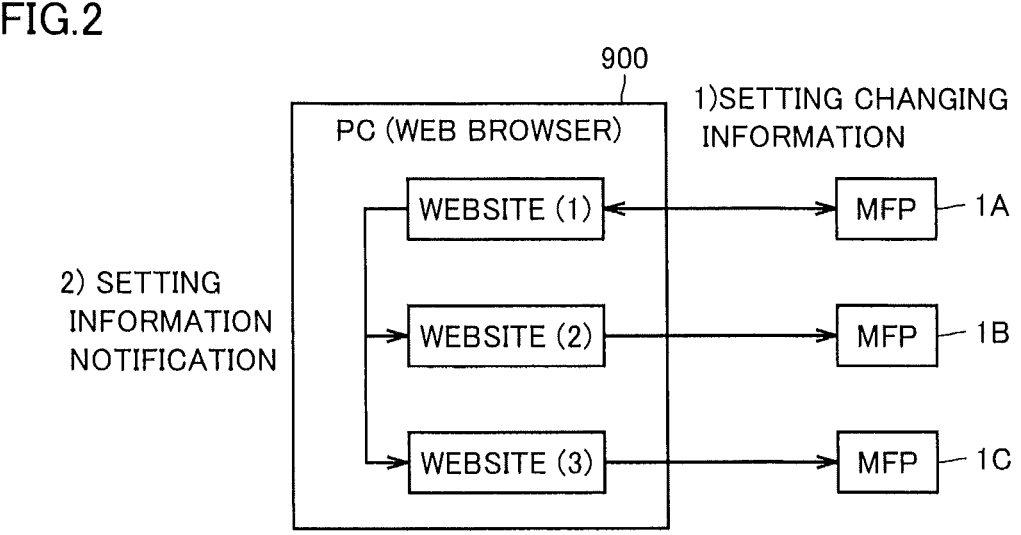
FIG. 2 is a view schematically illustrating an outline of an operation in the image processing system of FIG. 1.

FIG. 2 is a view schematically illustrating an outline of an operation in the image processing system of FIG. 1.

In the embodiment, each of MFPs 1A to 1C acts as a server. In FIG. 2, a web browser installed in PC 3 is illustrated as a Web browser 900. PC 3 accesses websites of MFPs 1A to 1C through Web browser 900. In FIG. 2, the website of MFP 1 is illustrated as a "website (1)", a "website (2)", and a "website (3)". In the case that the plurality of PCs are included in the image processing system, the Web browser is installed in each PC, and each PC can access the website of MFP 1.

Predetermined information is input to website (1) in Web browser 900, which allows setting contents (such as an accessible user and processing contents that can be utilized by the user) with respect to MFP 1A to be registered in PC 3. The registered setting contents are reflected on the operation of MFP 1A. That is, in MFP 1A, for example, user's login is required to manipulate MFP 1A, information identifying the registered accessible user is referred to with respect to the user who tries the login, and whether or not the user logins to MFP 1A is determined.

In the embodiment, website (2) and website (3) are notified of the setting contents input to website (1), and the setting contents are also registered in MFP 1B and MFP 1C.

Therefore, in PC 3, the same effect as inputting to website (2) and website (3) is exerted when predetermined setting contents are input to website (1) in Web browser 900. That is, the user of PC 3 performs a manipulation to input the setting contents to MFP 1A, which allows the user to obtain the same effect as inputting the setting contents without inputting the setting contents to MFP 1B and MFP 1C. Accordingly, the manipulation performed by the user can be reduced.

<Block Configuration of MFP>

Figure 3:
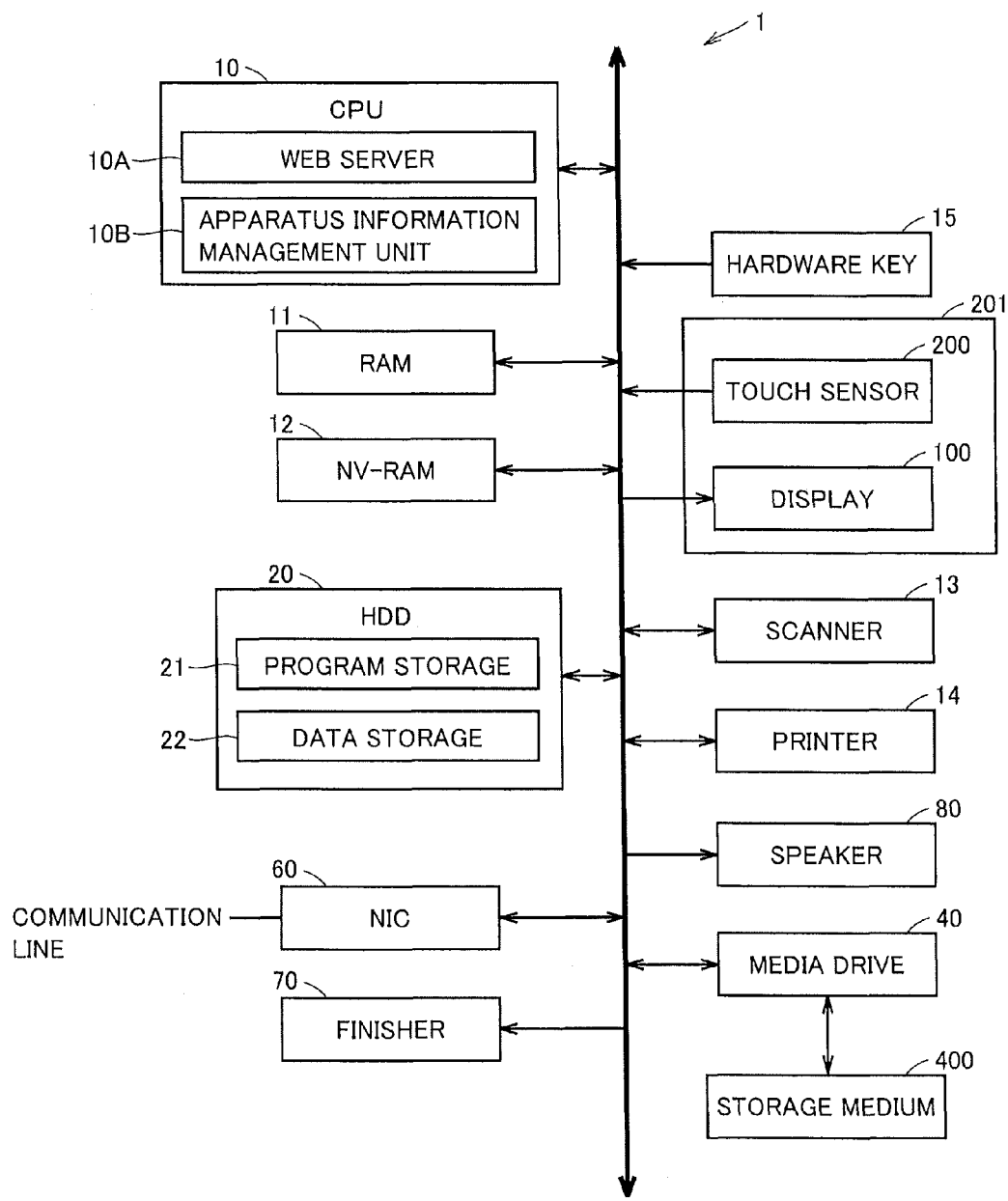
FIG. 3 is a view schematically illustrating a hardware configuration of an MFP (Multi-Functional Peripheral) of FIG. 1.

FIG. 3 is a view schematically illustrating a hardware configuration of MFP 1.

Referring to FIG. 3, MFP 1 includes a CPU (Central Processing Unit) 10 that wholly controls the operation of MFP 1, a RAM (Random Access Memory) 11 that constitutes a work area of CPU 10, and an NV (Non Volatile)-RAM 12 in which pieces of data such as an initial setting of MFP 1 are stored. MFP 1 also includes an HDD (Hard Disc Drive) 20. HDD 20 includes a program storage 21 in which a program executed by CPU 10 is stored and a data storage 22 in which various pieces of data such as a user database are stored.

CPU 10 includes a Web server 10A and an apparatus information management unit 10B as functions thereof. These functions are implemented such that CPU 10 executes the program stored in program storage 21 or a recording medium 400. The functions may be implemented by hardware such as a dedicated LSI (Large Scale Integration) incorporated in MFP 1.

Web server 10A is a system having a role in returning a some sort of service in response to a request that is received from Web browser 900 of PC 3 through the network. Apparatus information management unit 10B is a function of managing the operation of MFP 1. For example, apparatus information management unit 10B determines whether the user's login is permitted when the manipulation to try the login to MFP 1, or apparatus information management unit 10B performs operation control of an image processing function of MFP 1.

MFP 1 includes an NIC (Network Interface Card) 60 that transmits and receives pieces of data such as image data to and from an external device through communication lines such as a public telephone line and a LAN (Local Area Network). In addition to transmitting and receiving facsimile data through the public telephone line, NIC 60 transmits and receives data to and from the external device, which is connected to a network such as the LAN and the Internet, through the network by utilizing an electronic mail system or a file transfer system. Therefore, MFP 1 has not only a function as a facsimile machine that conducts a usual facsimile communication but also a function as a transmitting/receiving terminal and a file transmitting/receiving terminal of the electronic mail. MFP 1 may conduct communication in either a wired manner or a wireless manner.

MFP 1 includes a scanner 13 and a printer 14. Scanner 13 reads a manuscript in a photoelectric manner to acquire image data. Printer 14 prints an image on a sheet based on the image data acquired by scanner 13 or the image data that is received from an apparatus (such as the PC) connected through the network. Printer 14 also forms the image of the image data (document), which is received through the network, in response to an instruction from the apparatus connected through the network.

MFP 1 includes plural hardware keys 15 that receive a manipulation input and inputs of characters and numeric characters with respect to various pieces of processing. MFP 1 includes a display 100 that displays a manipulation screen and various pieces of information. A touch sensor 200 is overlapped on display 100, and a touch screen 201 is constructed by display 100 and touch sensor 200. In MFP 1, the manipulation screen including a setting key is displayed on display 100. MFP 1 receives the input from the user by detecting a manipulation to come into contact with touch sensor 200 with respect to a display region of the setting key. MFP 1 receives the input from the user by detecting a manipulation with respect to a hardware key 15.

MFP 1 includes a finisher 70 that staples the sheets in each of which the image is formed by printer 14, a speaker 80 that outputs a voice, and a media drive 40 that performs write/read processing of the data to recording medium 400 that is detachably attached to a main body of MFP 1. A medium in which the pieces of data such as the program are stored in a nonvolatile manner can be cited as recording medium 400, and examples of the medium include a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical Disc), an MD (Mini Disc), an IC (Integrated Circuit) card (except the memory card), an optical card, a mask ROM, an EPROM, and an EEPROM (Electronically Erasable Programmable Read-Only Memory).

<Block Configuration of PC>

Figure 4:
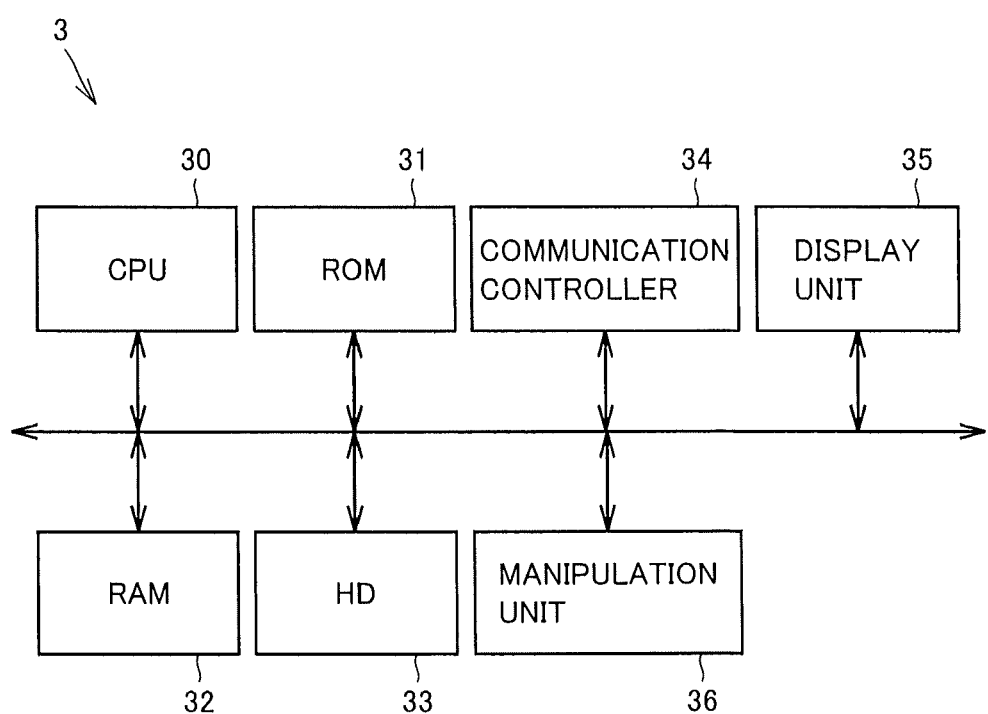
FIG. 4 is a view illustrating a block configuration of a PC (Personal Computer) of FIG. 1.

FIG. 4 is a view illustrating a block configuration of PC 3.

As described above, PC 3 is constructed by the general-purpose computer and the like. Referring to FIG. 4, by way of example, PC 30 includes a CPU 30 that is of a processor for controlling the whole of PC 3, a ROM 31 in which a program executed by CPU 30 is stored, a RAM 32 that acts as a work area when CPU 30 executes the program, an HD (Hard Disk) 33 in which an application program of Web browser 900 is stored, a communication controller 34 that controls communication through the LAN, a display 35 that display information, and a manipulation unit 36 that receives an input of the information to PC 3.

ROM 31 and HD 33 may be constructed by or replaced with a medium in which the pieces of data such as the program are stored in a nonvolatile manner. Examples of the medium include the CD-ROM, the DVD-ROM, the USB memory, the memory card, the FD, the hard disk, the magnetic tape, the cassette tape, the MO, an MD (Mini Disc), the IC card (except the memory card), the optical card, the mask ROM, the EPROM, and the EEPROM Display devices such as a liquid crystal display device can be cited as display 35. Input devices such as a keyboard and a mouse can be cited as manipulation unit 36.

<Input of Setting Content of MFP>

Figure 5:
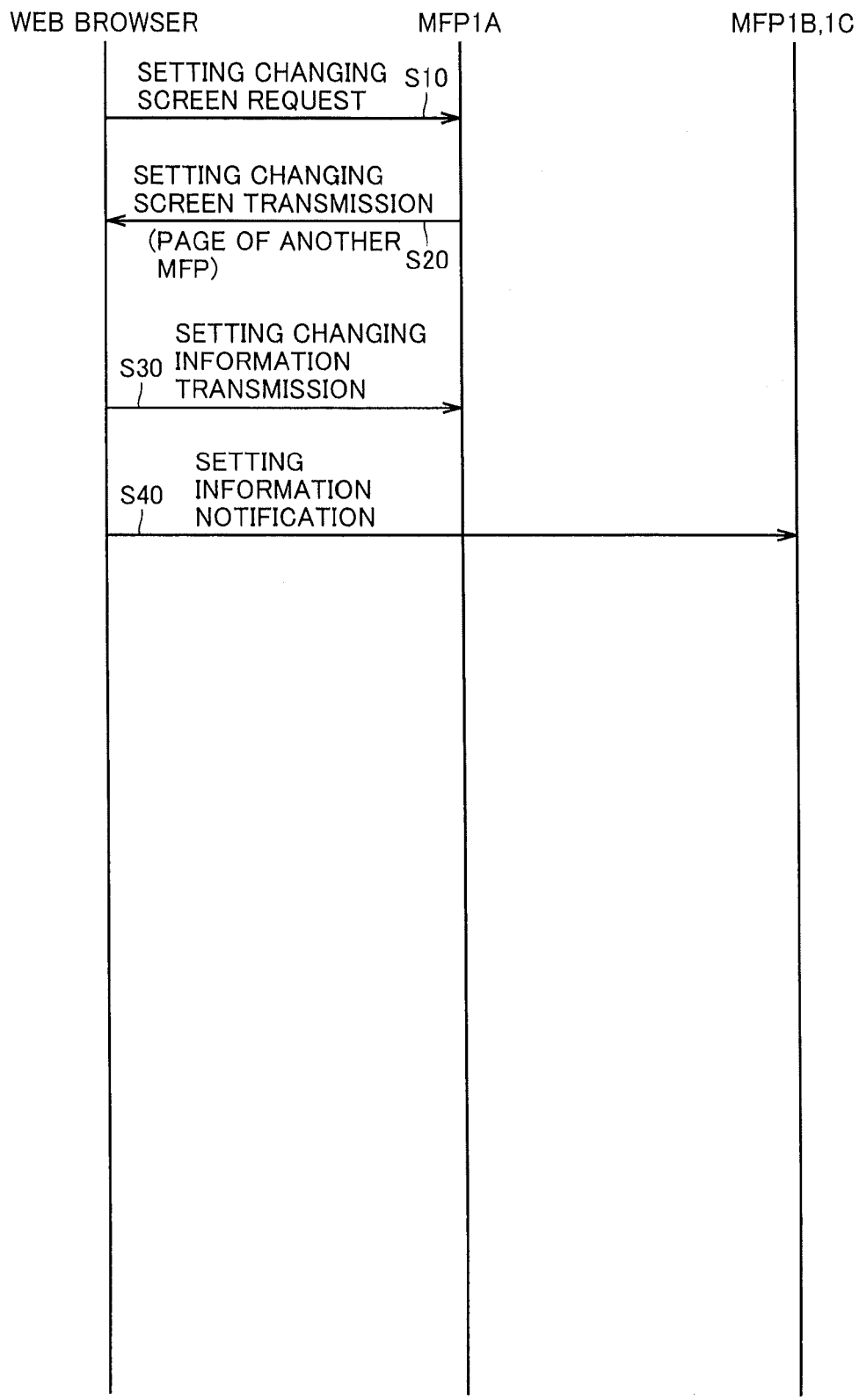
FIG. 5 is a sequence diagram when a setting content of the MFP is changed through a Web browser of the PC in the image processing system of FIG. 1.

FIG. 5 is a sequence diagram when the setting contents of MFP 1A are changed through the Web browser (website of MFP 1A) of PC 3 in the image processing system of the embodiment.

Referring to FIG. 5, in PC 3, CPU 30 receives inputs of information selecting one of MFPs 1A to 1C and information specifying the desired setting content to be changed in the selected MFP through manipulation unit 36. In response to the inputs of the pieces of information, CPU 30 determines which one of MFPs 1A to 1C is selected and which page in the website provided by selected MFP 1. In HD 33, for example, the pieces of information and a URL (Uniform Resource Locator) of the page of which the request should be made to change the setting content of MFP 1 are stored while correlated with each other.

In response to the inputs of the pieces of information, CPU 30 makes a request of the determined page (Step S10). For example, when the input is the setting content that an e-mail address of a user is registered in MFP 1A, CPU 30 makes the request of the setting changing screen relating to the registration of the e-mail address to MFP 1A.

In response to the request, CPU 10 (Web server 10A) of MFP 1A transmits the setting changing screen (page) corresponding to the request to PC 3 (Step S20). The setting changing screen is displayed in PC3.

Figure 6:
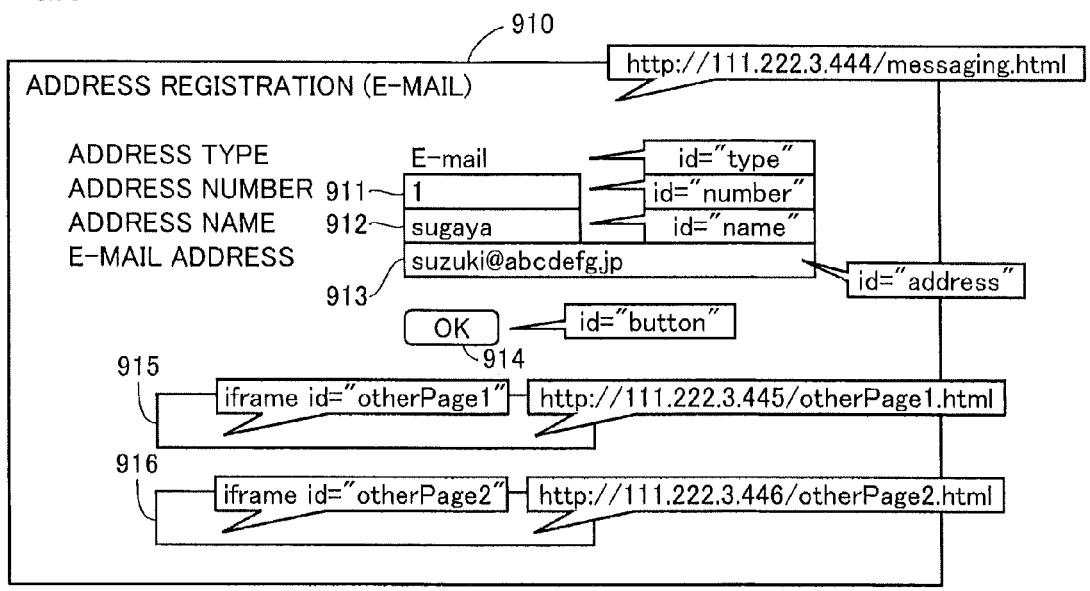
FIG. 6 is a view illustrating an example of a setting changing screen.

FIG. 6 is a view illustrating an example of the setting changing screen. A screen 910 of FIG. 6 is one on which the e-mail address of the user is registered. FIG. 7 illustrates an example of a source code that displays screen 910 of FIG. 6.

The source code of FIG. 7 is described in an HTML (Hypertext Markup Language)5. Cross-document messaging that is of a specification mounted on HTML5 is utilized in the description, and the description includes a communication script and a screen display script.

Referring to FIG. 6, screen 910 includes a field 911 to which an address number of the e-mail address to be registered is input, a field 912 to which an address name is input, a field 913 to which the e-mail address is input, an OK button 914 that transmits and registers the contents input to fields 911 to 913 to and in MFP 1A, and frames 915 and 916 in which the websites of other MFPs 1 in the system are displayed.

Functions, which have the pieces of data input to fields 911 to 913 in the source code of FIG. 7, as values are illustrated together with screen 910 in balloons of FIG. 6. The contents displayed in the balloon of FIG. 6 are described for the purpose of explanation, and the contents in the balloon are not displayed on the actual screen.

Field 911 corresponds to "id="number"". Field 912 corresponds to "id="name"". Field 913 corresponds to "id="address"". "E-mail" displayed on screen 910 while correlated with the "address type" corresponds to "id="type"" in the source code of FIG. 7

OK button 914 on screen 910 corresponds to "id="button"". In FIG. 7, "iframe id="otherPage1"" and "http://111.222.3.445/otherPage1.html" are pieces of information specifying the page displayed in frame 915. In FIG. 7, "iframe id="otherPage1"" and "http://111.222.3.446/otherPage2.html" are pieces of information specifying the page displayed in frame 916. "http://111.222.3.445/otherPage1.html" and "http://111.222.3.446/OtherPage2.html" are pages notifying other MFPs 1 of the setting contents input to MFP 1A (in the embodiment, the page notifying MFP 1B and MFP 1C because screen 910 is described as the setting page of MFP 1A).

The communication script of FIG. 7 is a description that transmits "E-mail", which is displayed while correlated with the pieces of data input to fields 911 to 913 and the address type", to another Web page specified as a value of a function "postMessage". In the example of FIG. 7, a page of "http://111.222.3.445/" displayed in frame 915 and a page of "http://111.222.3.446/" displayed in frame 916 are assigned as transmission destinations.

When OK button 914 is manipulated on screen 910, the values (corresponding to "id="type"", "id="number"", "id="name"", and "id="address"") input on screen 910 are transmitted as the setting information to MFP 1A (Step S30). Web server 10A receives the pieces of information, and transmits the pieces of information to apparatus information management unit 10B. Based on the pieces of information, apparatus information management unit 10B updates registration contents of the user who is registered in data storage 22. Specifically, address input to field 913 is registered in the user database of MFP 1A as the e-mail address of the user, to whom the address number of the value input to field 911 and address name input to field 912 are added. For example, information specifying the user who is permitted to utilize the apparatus is registered in the user database.

FIG. 8 illustrates the source code of the page displayed in frame 915 of FIG. 7. The source code of FIG. 8 includes the communication script and the setting information.

In FIG. 8, the communication script defines a notifying listener. Based on the manipulation of OK button 914 on screen 910 of FIG. 6, the notifying listener transmits the values (corresponding to "id="type"", "id="number"", "id="name"", and "d="address"") input on screen 910 as "message[0]", "message[1]", "message[2]", and "message [3]" to the setting websites (website (2)) of MFP 1B and the setting websites (website (3)) of MFP 1C (Step S40).

In the setting information of FIG. 8, the transmission destinations (register_address.cgi) of MFP 1B and MFP 1C are assigned. In MFP 1B and MFP 1C, the value are transmitted to the CGI program, and the registration contents of the user are updated. Therefore, in each of MFP 1B and MFP 1C, the address input to field 913 is registered in the user database as the e-mail address of the user, to whom the address number of the value input to field 911 and the address name input to field 912 are added.

Effect of Embodiment

According to the embodiment of the invention, in the image processing system, MFP 1A acts as the server, the Web page is stored in data storage 22 in order to change the setting of MFP 1A, and the Web page is transmitted in response to the request from PC 3. When the information (including information registering the information) changing the setting of the Web page of MFP 1A is received from PC 3, the setting of MFP 1A is changed based on the information received from PC 3, and the websites of other MFPs 1 (MFP 1B and MFP 1C) in the image processing system are notified of the information received from PC 3.

Other MFPs 1 change the settings thereof based on the received information (the received information is newly registered).

In the embodiment, as illustrated in FIG. 9, in display screen 800 of the Web browser, the display ("setting 1", "setting 2", "setting 3", and "setting 4") is performed to input the setting contents of a certain MFP in the website (HP (1)) of the MFP, and a button (button 801) is displayed to transmit the input contents to the MFP based on the display, and the websites of other MFPs in the image processing system are displayed (a button 802 and a button 803 that display the websites of other MFPs). When the setting contents of a certain MFP are input to display screen 800, the effect that the same setting contents are input to at least one other MFP is obtained. Specifically, as illustrated in FIGS. 10A to 10C, the same effect as inputting the setting contents to the websites (a screen 811 of FIG. 10A, a screen 812 of FIG. 10B, and a screen 813 of FIG. 10B) of three MFPs can be obtained by inputting the setting contents to display screen 800.

Therefore, the user of PC 3 can reflect the same setting on other MFPs 1 in the image processing system by performing the manipulation to change the setting to MFP 1A on the website of MFP 1A.

In the embodiment, by way of example, other MFPs 1 are notified by mounting a structure (event listener) notifying websites of other MFPs on the websites of MFP 1A as illustrated in FIGS. 7 and 8. As illustrated in FIG. 6, other websites are displayed as the frames in the website of MFP 1A.

In the embodiment, the websites of MFP 1B and MFP 1C, which are displayed in the frames of the website of MFP 1A, are notified of the setting contents input to the website of MFP 1A. In the case that the setting contents of MFP 1B are input in the website of MFP 1B, the websites of MFP 1A and MFP 1C are notified of the setting contents. In the case that the setting contents of MFP 1B are input in the website of MFP 1C, the websites of MFP 1A and MFP 1A are notified of the setting contents. That is, in the embodiment, the websites of MFP 1A and MFP 1C are displayed in the frames of the website of MFP 1B, and the websites of MFP 1A and MFP 1C are notified of the setting contents input to the website of MFP 1B. The websites of MFP 1A and MFP 1B are displayed in the frames of the website of MFP 1C, and the websites of MFP 1A and MFP 1B are notified of the setting contents input to the website of MFP 1C.

<Generation of Communication Script>

The generation of the communication script of FIG. 7 will be described.

Figure 14:
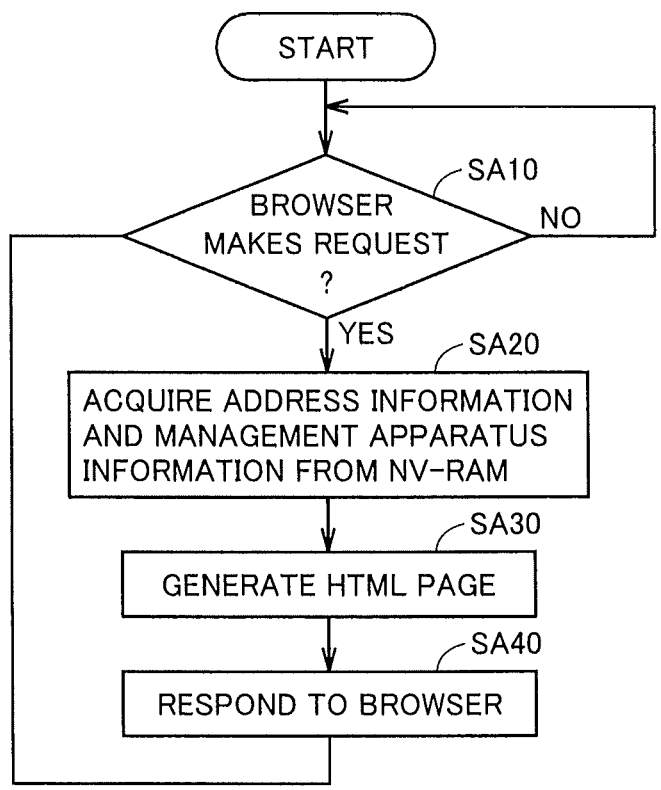
FIG. 14 is a flowchart of processing of generating a communication script of FIG. 7.

FIG. 14 is a flowchart of communication script generating processing performed by PC 3.

Referring to FIG. 14, CPU 30 monitors whether Web browser 900 makes a request to generate the communication script in the website of MFP 1 of the processing target (Step SA10). When receiving the request (YES in Step SA10), CPU 30 progresses the processing to Step SA20. When the user of PC 3 selects a communication script generating menu in Web browser 900, Web browser 900 makes the request to generate the communication script.

In Step SA20, CPU 30 acquires the address information and the management apparatus information, which are previously set in the website of MFP 1 of the processing target, from NV-RAM 12 of MFP 1 of the processing target, and progresses the processing to Step SA30.

The address information means information specifying the website of another MFP 1. The management apparatus information means information assigning the website notified of the setting contents as displayed in frames 915 and 916. The settings of the address information and management apparatus information, which are performed in advance of the processing of FIG. 14 (or as interrupt processing), will be described below.

In the Web browser invoked in PC 3, when a menu setting the address information and management apparatus information is selected in the website of MFP 1 of the processing target, a screen 500 is display on display 35 as illustrated in FIG. 15.

In screen 500 of FIG. 15, a management target and an IP address are correlated with each of No. 1 to No. 10. In screen 500, the IP address of the website of MFP 1 is illustrated in a field of the IP address. Information indicating whether the website is set to a notification target of the setting contents is displayed in a field of the management target. In FIG. 15, a blacked-out square graphic indicates the notification target, and an outline square graphic indicates the non-notification target.

In screen 500, a button 501 is manipulated in order to add the IP address to the field of the IP address. When button 501 is manipulated, a screen 510 of FIG. 16 is displayed on display 35.

Screen 510 of FIG. 16 is used to input the IP address while the IP address is correlated with each of No. 1 to No. 10. The user manipulates manipulation unit 36 to edit the field of the IP address on screen 510, manipulates a button 511, thereby reflecting the edit contents on the field of the IP address on screen 500 of FIG. 15. On the other hand, when the user manipulates a button 512 of a screen 510 of FIG. 16, screen 500 is displayed on display 35 without reflecting the edit contents of screen 510.

On screen 500, the user manipulates manipulation unit 36 to edit the field of the management target corresponding to each IP address, thereby editing the information indicating whether the IP address is set to the notification target of the setting contents. When user manipulates button 502 of screen 500, the edit contents of screen 500 are stored in NV-RAM 12 as the address information and the management apparatus information of the website of MFP 1 of the processing target.

For example, when the edit contents displayed on screen 500 of FIG. 15 are stored in NV-RAM 12, four IP addresses of "111.222.3.445", "111.222.3.446", "111.222.3.555", and "111.222.3.556" described in the field of the IP address of screen 500 are stored as the address information. The pieces of information, which are assigned as the notification target by the websites corresponding to the two IP addresses of "111.222.3.445" and "111.222.3.446" corresponding to the blacked-out square graphics in the field of the management target in screen 500, are stored as the management apparatus information.

Referring to FIG. 14, when the address information and the management apparatus information are acquired in Step SA20, CPU 30 generates the communication script (communication script of FIG. 7) using the pieces of information and generates the HTML page (FIG. 7) including the communication script in Step SA30. In the generated communication script, the address information and the management apparatus information are utilized as the information specifying the transmission destination specified as the value of the function "postMessage".

In Step SA40, CPU 30 sends back the HTML page generated in Step SA30 to the Web browser. Therefore, the HTML page is stored in NV-RAM 12 as the information on the website of the processing target (source code of FIG. 7).

That is, in the embodiment, the communication script is generated such that the website that is set as the notification target in MFP 1 is notified of the setting contents.

<Modifications>

Figure 11:
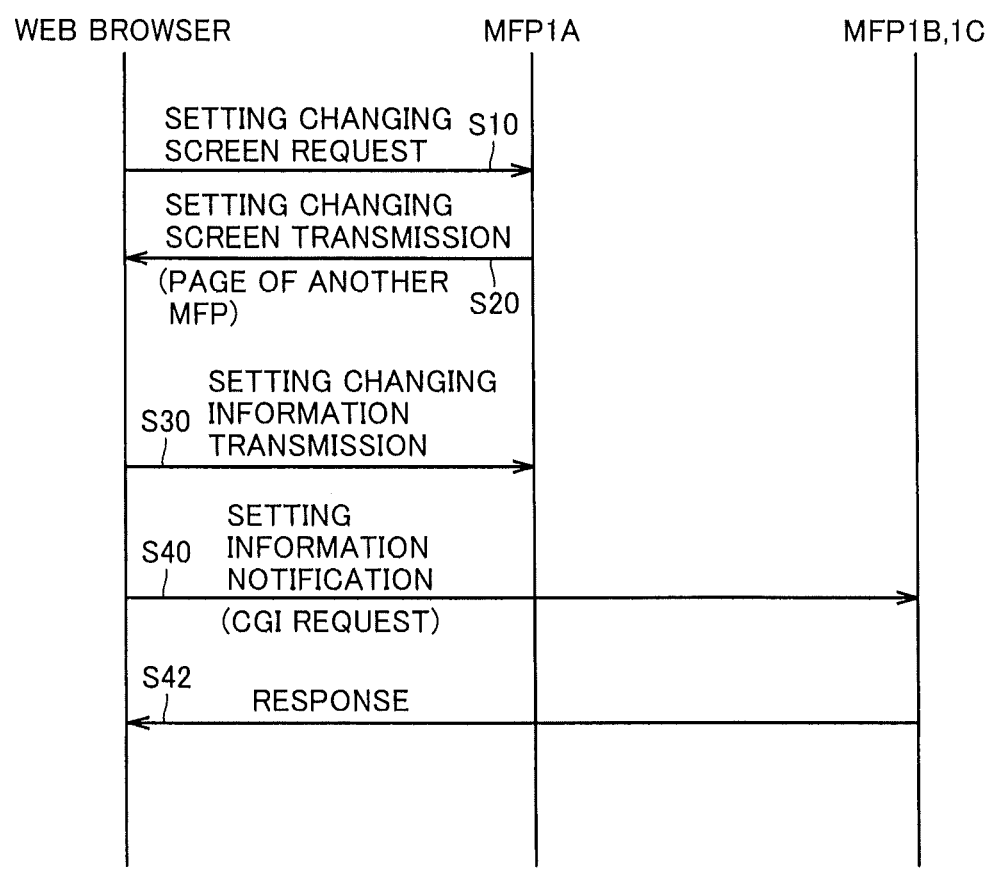
FIG. 11 is a view illustrating a modification of the sequence diagram of FIG. 5.

As illustrated in FIG. 5, in the embodiment, the Web page of MFP 1A transmits the setting changing information input to MFP 1A to MFP 1A in Step S40. Preferably Web server 10A of each MFP 1 may be configured to send back a response indicating whether the setting of MFP 1 is successfully changed based on the setting changing information to Web server 900 in Step S42, as illustrated in FIG. 11, when MFP 1 received setting changing information input to certain MFP 1.

When receiving the response, preferably Web browser 900 causes CPU 30 to display the received result indicating whether or not the setting of MFP 1 is successfully changed on display 35. When the response that the setting of MFP 1 is successfully changed is received from MFP 1 of the notification target, a message that "setting change is completed in XXX" is displayed on display 35. When the response that the setting of MFP 1 is unsuccessfully changed is received, a message that "setting change cannot be performed in XXX" is displayed on display 35. "XXX" means the notification target (MFP 1B or MFP 1C).

The response may be transmitted using a request parameter (for example, object "abbr"). That is, in the image processing system, it is assumed that a parameter "yes" of the object is set according to a "successful setting change" transmitted as the response, and it is assumed that a parameter "no" of the object is set according to an "unsuccessful setting change". Therefore, the request parameter "abbr=yes" or "abbr=no" is transmitted as the response. When "abbr=yes" is received, Web browser 900 displays the message, which is received from MFP 1 of the notification destination when the setting is successfully changed, on display 35. On the other hand, when "abbr=no" is received, Web browser 900 displays the message, which is received from MFP 1 of the notification destination when the setting is unsuccessfully changed, on display 35. An amount of communication data can be reduced by utilizing the request parameter.

In the embodiment, by way of example, other MFPs 1 are notified by mounting a structure (event listener) notifying websites of other MFPs on the websites of MFP 1A as illustrated in FIGS. 7 and 8, and other websites are displayed as the buttons in MFP 1A as illustrated in FIG. 9.

Figure 12:
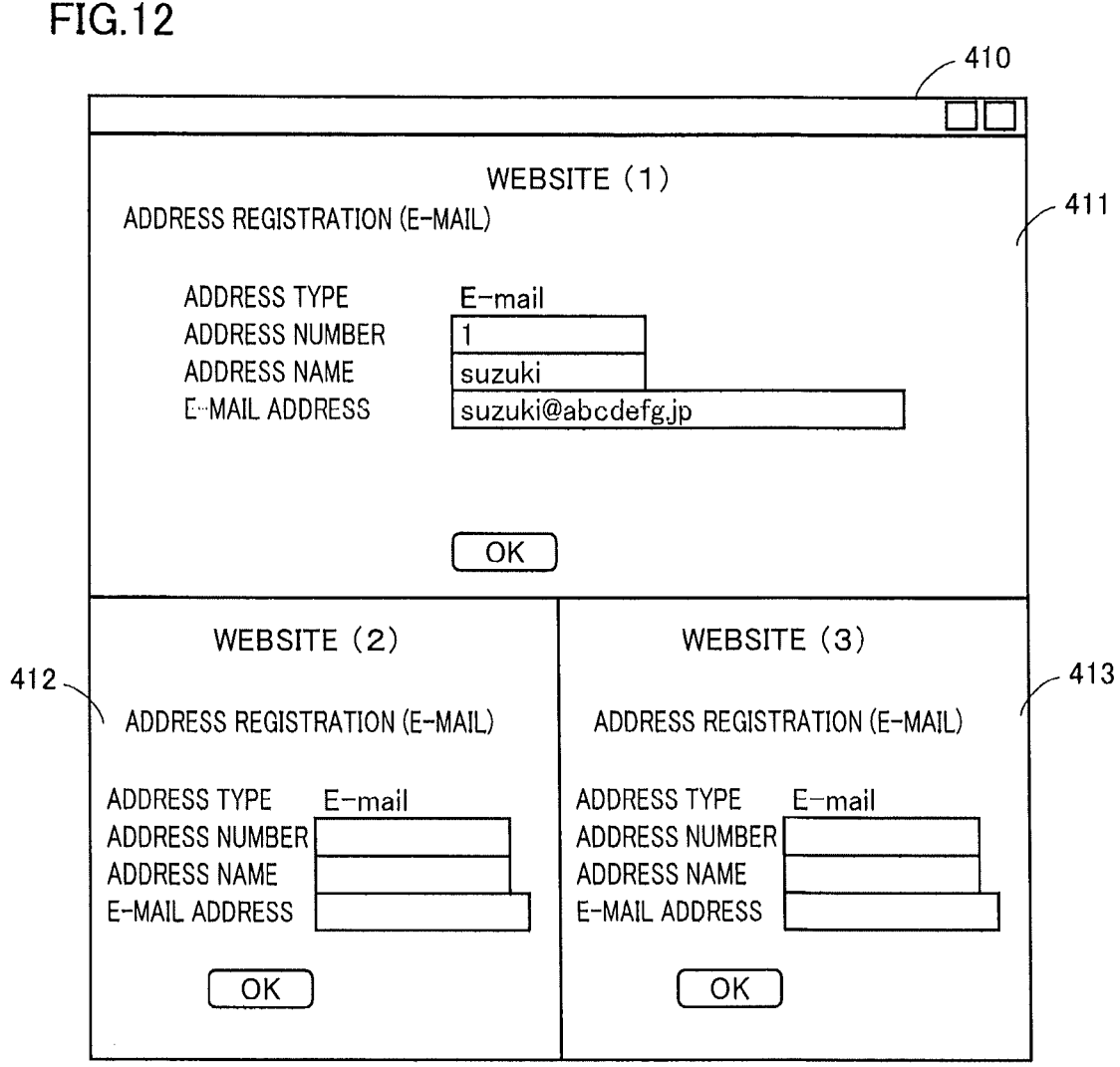
FIG. 12 is a view illustrating a modification of the screen of FIG. 6.

The Web browser installed in PC 1 may be configured such that one screen is divided to be able to display the websites of at least two MFPs 1, for example, as provided as an extension function of Firefox® of Mozilla Foundation. FIG. 12 illustrates a display example. In a screen 410 of the Web browser of FIG. 12, the websites of MFP 1A to MFP 1C are displayed as frames 411 to 413. Not only other websites are displayed in the website of one MFP 1 are displayed as the buttons, but also the websites of plural MFPs 1 may be displayed on the same screen.

In the example of FIG. 12, frame 411 corresponds to website (1) of FIG. 10A, frame 412 corresponds to website (2) of FIG. 10B, and frame 413 corresponds to website (3) of FIG. 10C. In the example of FIG. 12, on screen 410, the websites of plural MFPs 1 are simultaneously displayed as frame 411 to 413. Therefore, each of frames 411 to 413 does not include a button that displays the websites of MFPs 1 except MFP 1 that becomes the display target in each page.

Figure 13:
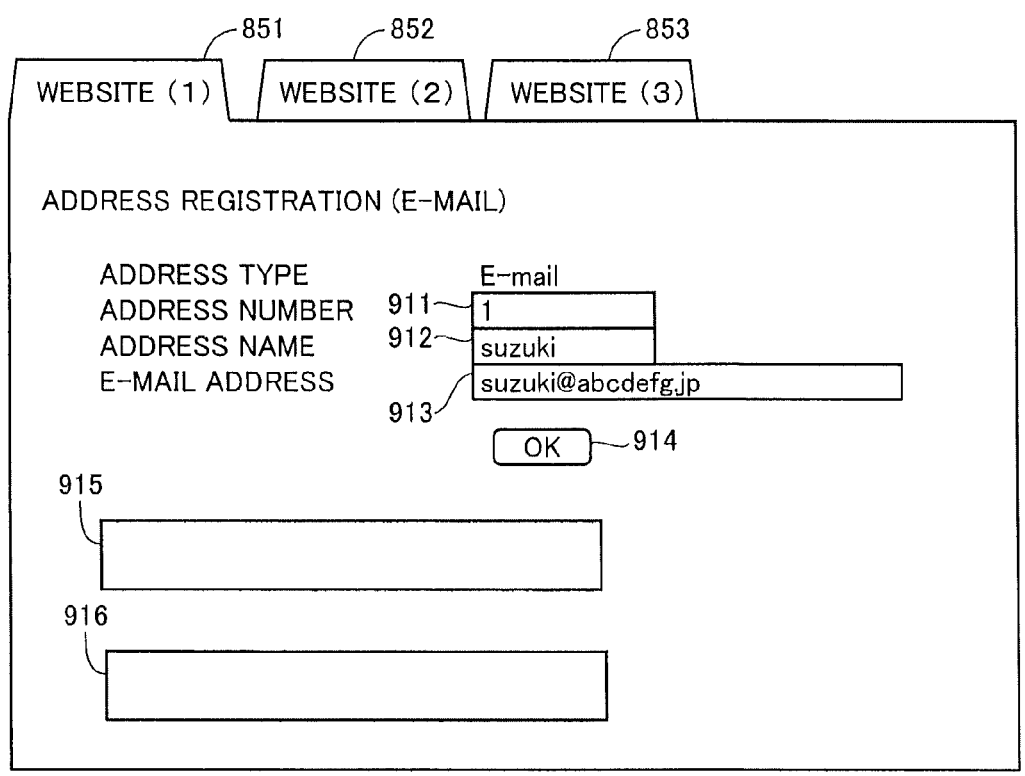
FIG. 13 is a view illustrating another modification of the screen of FIG. 6.

Web browser 900 may display the screen (frames 411 to 413) of the websites, which are displayed on display 35 while correlated with one another, as a tab screen. FIG. 13 illustrates a display example.

Tabs 851, 852, and 853 are displayed in FIG. 13. Tab 851 is used to display the page for setting MFP 1A, tab 852 is used to display the page for setting MFP 1B, and tab 853 is used to display the page for setting MFP 1C.

In the example of FIG. 13, the screen displayed by tab 851 corresponds to website (1) of FIG. 10A. The information corresponding to the source code is displayed on the screen. That is, similarly to screen 910 of FIG. 6, field 911 corresponding to "id="number"", field 912 corresponding to "id="name"", field 913 corresponding to "id="address"", "E-mail 1" corresponding to "id="type"", button 914 corresponding to "id="button"", frame 915 corresponding to "iframe id="otherPage1"", and frame 916 corresponding to "iframe id="otherPage2" are included.

In the example of FIG. 13, the screen displayed by tab 852 corresponds to website (2) of FIG. 10B and the screen displayed by tab 853 corresponds to website (3) of FIG. 10C.

As described above, according to the embodiment, other image processing apparatuses that can conduct communication with the terminal are notified of the setting contents, which are input to the setting Web page at the terminal in order to change the setting of a certain image processing apparatus. Therefore, the operating conditions of the plurality of image processing apparatuses in the network system can easily be set by minimally changing the structure.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus that can conduct communication with a terminal through a network, comprising:

a non-transitory memory device that stores a setting Web page, which is a Web page used to change a setting of the image processing apparatus;

a communication unit that transmits the setting Web page to the terminal on a request from the terminal; and a changing unit that changes the setting of the image processing apparatus when a request is made to the setting Web page from the terminal, wherein the setting Web page includes a description that notifies another setting Web page, which is a Web page used to change a setting of another image processing apparatus, which can conduct communication with the terminal, of a setting content of the image processing apparatus, the setting content being input to the setting Web page from the terminal, wherein the communication unit receives a setting content of said another image processing apparatus notified to the setting Web page from the another setting Web page through the network, the changing unit changes the setting of the image processing apparatus based on the setting content of said another image processing apparatus in accordance with the notification, and the communication unit transmits a result indicating whether or not the setting is successfully changed in the image processing apparatus to the terminal in accordance with the notification.

2. The image processing apparatus according to claim 1, wherein the communication unit receives the result using a request parameter.

3. The image processing apparatus according to claim 1, further comprising:

a reception unit that receives a request to transmit the setting Web page, wherein the communication unit transmits the setting Web page to the terminal based on the request received by the reception unit, the reception unit receives the information, input to the setting Web page by the terminal, from the terminal, the changing unit changes the setting of the image processing apparatus based on the information received by the reception unit, and the setting Web page includes a description that notifies another setting Web page stored in a non-transitory memory device of said another image processing apparatus, the information input by the terminal.

4. The image processing apparatus according to claim 1, wherein the setting Web page is related to the another setting Web page for changing the setting of another image processing apparatus, and the setting Web page includes a description that notifies another setting Web page the information input to the setting Web page, and the another image processing apparatus changes the setting of another image processing apparatus based on the information notified to the another setting Web page.

5. A non-transitory computer-readable recording medium in which a program able to be executed by a computer, which can conduct communication with a first image processing apparatus and a second image processing apparatus, is recorded, the program causing the computer to execute the steps of:

(a) receiving an input to a Web page at the computer, wherein said input includes information for changing a setting of the first image processing apparatus;

(b) transmitting the information input to the Web page from the computer to the first image processing apparatus in accordance with the input of the information;

(c) notifying the information input to the Web page at the computer to another Web page, which is a Web page used to change a setting of said second image processing apparatus; and (d) transmitting the information input to the Web page from the computer to the second image processing apparatus based on the notification of the information input to the Web page to the other Web page;

wherein the program further causes the computer to execute the steps of:

notifying the Web page to change the setting of said first image processing apparatus in response to input of the information into the other Web page at the computer;

causing said first image processing apparatus to change the setting of said first image processing apparatus based on the setting content of said second image processing apparatus in response to the notification; and receiving a result, transmitted by said first image processing apparatus, indicating whether or not the setting is successfully changed in the first image processing apparatus in response to the notification to the computer.

6. The non-transitory computer-readable recording medium according to claim 5, wherein said program recorded thereon further causes the computer to execute the step of:

(e) requesting to transmit the Web page to the first image processing apparatus, wherein in the step (a), the input to the Web page, transmitted by the first image processing apparatus in response to the request in step (e), is received, and in the step (c), the information is notified to another setting Web page stored in a non-transitory memory device of said second image processing apparatus.

7. The non-transitory computer readable recording medium according to claim 5, wherein the setting Web page is related to the another setting Web page for changing the setting of said second image processing apparatus, and the setting Web page includes a description that notifies another setting Web page the information input to the setting Web page, and the second image processing apparatus changes the setting of said second image processing apparatus based on the information notified to the another setting Web page.

8. An image processing system comprising:

a terminal; and a plurality of image processing apparatuses each of which can conduct communication with the terminal, wherein a first image processing apparatus includes:

a non-transitory memory device that stores a setting Web page, which is a Web page used to change a setting of the first image processing apparatus;

a communication unit that transmits the setting Web page to the terminal on a request from the terminal; and a changing unit that changes the setting of the first image processing apparatus when a request is made to the setting Web page from the terminal, wherein the setting Web page includes a description that notifies at least one other setting Web page, which is used to change a setting of at least a second image processing apparatus of a setting content of the first image processing apparatus, the setting content being input to the setting Web page from the terminal, wherein said second image processing apparatus changes the setting of the second image processing apparatus based on the setting content of the first image processing apparatus in accordance with the notification, and transmits a result indicating whether or not the setting is successfully changed in the second image processing apparatus to the terminal in accordance with the notification.

9. The image processing system according to claim 8, wherein said second image processing apparatus transmits the result using a request parameter.

10. The image processing system according to claim 8, further comprising:

a requesting unit that requests the first image processing apparatus to transmit the setting Web page, a first reception unit that receives information for changing the setting Web page, and a notifying unit that notifies the information received by the reception unit to the first image processing apparatus, and the first image processing apparatus includes:

a second reception unit that receives a request to transmit the setting Web page from the terminal, wherein the communication unit transmits the setting Web page to the terminal based on the request received by the second reception unit, the changing unit changes the setting of the first image processing apparatus based on the notification from the notifying unit, and the setting Web page includes a description that notifies said at least one other setting Web page, stored in a non-transitory memory device of said second image processing apparatus, the information input by the terminal.

11. The image processing system according to claim 8, wherein the setting Web page is related to the other setting Web page for changing the setting of the second image processing apparatus, the setting Web page includes a description that notifies the other setting Web page the information input to the setting Web page, and the second image processing apparatus changes the setting of the second image processing apparatus based on the information notified to the another setting Web page.

12. A non-transitory computer-readable recording medium in which a program able to be executed by a computer, which can conduct communication with a first image processing apparatus and a second image processing apparatus, is recorded, the program causing the computer to execute the steps of:

(a) correlating a Web page to change the setting of said first image processing apparatus with another Web page to change the setting of said second image processing apparatus;

(b) receiving an input to said Web page at the computer, wherein said input includes information for changing a setting of the first image processing apparatus;

(c) transmitting the information input to the Web page from the computer to the first image processing apparatus in accordance with the input of the information;

(d) notifying the information input to the Web page at the computer to the other Web page correlated with the Web page; and (e) transmitting the information input to the Web page from the computer to the second image processing apparatus based on the notification of the information input to the Web page to the other Web page.

13. The non-transitory computer-readable recording medium according to claim 12, wherein said Web page includes a description to notify the other Web page of the information input to the Web page.

14. The non-transitory computer-readable recording medium according to claim 12, wherein the setting to correlate the Web page with the other Web page is set to the Web page.

* * * * *